(12) United States Patent
Alexandrovichserov et al.

(10) Patent No.: US 9,012,107 B2
(45) Date of Patent: *Apr. 21, 2015

(54) CATHODE CATALYST FOR FUEL CELL, METHOD OF PREPARING SAME, AND MEMBRANE-ELECTRODE ASSEMBLY COMPRISING SAME

(75) Inventors: Alexey Alexandrovichserov, Suwon-si (KR); Chan Kwak, Suwon-si (KR); Ho-Jin Kweon, Suwon-si (KR); Si-Hyun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1429 days.

This patent is subject to a terminal disclaimer.

(21) Appl. No.: 11/956,534

(22) Filed: Dec. 14, 2007

(65) Prior Publication Data

US 2009/0011311 A1 Jan. 8, 2009

Related U.S. Application Data

(63) Continuation-in-part of application No. 11/595,949, filed on Nov. 13, 2006, now Pat. No. 7,887,972.

(30) Foreign Application Priority Data

Nov. 11, 2005 (KR) .............................. 2005-107972

(51) Int. Cl.
| | |
|---|---|
| *H01M 4/02* | (2006.01) |
| *B01J 31/00* | (2006.01) |
| *B01J 37/00* | (2006.01) |
| *C08F 4/02* | (2006.01) |
| *C08F 4/60* | (2006.01) |
| *H01M 4/92* | (2006.01) |
| *B01J 27/057* | (2006.01) |
| *H01M 8/02* | (2006.01) |
| *H01M 8/10* | (2006.01) |
| *H01M 8/22* | (2006.01) |
| *H01M 4/86* | (2006.01) |

(52) U.S. Cl.
CPC .............. *H01M 4/923* (2013.01); *H01M 4/926* (2013.01); *B01J 27/0573* (2013.01); *H01M 4/921* (2013.01); *H01M 8/0245* (2013.01); *H01M 8/1009* (2013.01); *H01M 8/22* (2013.01); *H01M 2004/8689* (2013.01); *Y02E 60/50* (2013.01)

(58) Field of Classification Search
CPC ..... H01M 4/923; H01M 4/926; H01M 4/921; H01M 8/22; H01M 2004/8689; B01J 27/0573; B01J 23/46; B01J 23/462; Y02E 60/50
USPC ......... 429/484–485, 487, 492, 523, 526, 528, 429/530–535, 480; 252/182.1; 420/900; 502/100–101, 215, 326, 117, 104, 216, 502/219, 220, 222, 177; 427/115
See application file for complete search history.

(56) References Cited

U.S. PATENT DOCUMENTS

| | | | |
|---|---|---|---|
| 4,288,422 A * | 9/1981 | Chianelli et al. | .............. 423/509 |
| 2002/0015878 A1 | 2/2002 | Tsumura et al. | |
| 2003/0078157 A1 | 4/2003 | Matsuoka et al. | |
| 2003/0157396 A1 | 8/2003 | Beckmann et al. | |
| 2004/0096728 A1 | 5/2004 | Campbell | |

FOREIGN PATENT DOCUMENTS

| | | |
|---|---|---|
| CN | 1521877 | 8/2004 |
| DE | 19644628 | 10/1996 |
| JP | 2001-502467 | 2/2001 |
| JP | 2002-100374 | 4/2002 |
| JP | 2002-289207 | 10/2002 |
| JP | 2004-349220 | 12/2004 |
| JP | 2005-129369 | 5/2005 |
| JP | 2005-294175 | 10/2005 |
| WO | WO 2004/021486 A2 | 3/2004 |

OTHER PUBLICATIONS

Alonson-Vante N et al., "The structure analysis of the active centers of Ru-containing electrocatalysts for the oxygen reduction. An in situ EXAFS study", Electrochimica Acta, Elsevier Science Publishers, vol. 47, No. 22-23, pp. 3807-3814, Aug. 30, 2002.
Office Action issued in corresponding European Patent Application No. 06023487.9 dated Jan. 5, 2009.
Japanese Office Action dated Jun. 29, 2010, issued in corresponding Japanese Patent No. 2006-307209.
Shukla, A., et al., *Methanol-Resistant Oxygen-Reduction Catalysts for Direct Methanol Fuel Cells*, Annual Review of Materials Research, vol. 33, (2003), pp. 155-168.
U.S. Office action dated Apr. 5, 2010, for parent U.S. Appl. No. 11/595,949, as well as U.S. Publication 2003/0157396, previously filed in an IDS dated Apr. 20, 2010.
U.S. Office action dated Aug. 18, 2010, for parent U.S. Appl. No. 11/595,949.
Patent Abstracts of Japan, and English machine translation of Japanese Publication 2002-100374, 26 pages.
Patent Abstracts of Japan, and English machine translation of Japanese Publication 2004-349220, 14 pages.
Patent Abstracts of Japan, and English machine translation of Japanese Publication 2005-294175, 15 pages.
Patent Abstracts of Japan and English machine translation of Japanese Publication 2005-129369.
SIPO Patent Gazette dated Sep. 22, 2010, for corresponding Chinese Patent application 200610063967.X, as well as U.S. and Chinese references previously filed in an IDS dated Mar. 6, 2009.
U.S. Notice of Allowance dated Nov. 1, 2010, for parent U.S. Appl. No. 11/595,949.
U.S. Appl. No. 11/595,949, filed Nov. 13, 2006, Alexandrovichserov et al., Samsung SDI Co., Ltd.
Japanese Patent Office action dated Aug. 8, 2012 for JP 2006-307209 with English translation (5 pages).

(Continued)

*Primary Examiner* — Barbara Gilliam
*Assistant Examiner* — Claire L Roe
(74) *Attorney, Agent, or Firm* — Christie, Parker & Hale, LLP

(57) ABSTRACT

The cathode catalyst for a fuel cell includes an RuSe alloy having an average particle size of less than or equal to 6 nm. The cathode catalyst may also include a metal carbide. The RuSe alloy is a highly active amorphous catalyst.

25 Claims, 10 Drawing Sheets

(56) References Cited

OTHER PUBLICATIONS

KIPO Office action dated Jun. 12, 2012 for KR 10-2005-0107972 with English translation (9 pages).

Gonzalez-Cruz, R. et al., "Oxygen reduction in acid media by a $Ru_xFe_ySe_z(CO)_n$ cluster catalyst dispersed on a glassy carbon-supported Nafion film", *J. Solid State Electrochem* (2003), vol. 7, pp. 289-295.

KIPO Office action dated Jun. 12, 2012 in priority KR application No. 10-2005-0107972 (4 pages).

EPO Office action dated Apr. 16, 2014, for corresponding European Patent application 06023487.9, (4 pages).

* cited by examiner

CATHODE CATALYST FOR FUEL CELL, METHOD OF PREPARING SAME, AND MEMBRANE-ELECTRODE ASSEMBLY COMPRISING SAME

CROSS-REFERENCE TO RELATED APPLICATION

This application is a continuation-in-part of U.S. patent application Ser. No. 11/595,949, filed on Nov. 13, 2006 now U.S. Pat. No. 7,887,972, which claims the benefit of Korean Application No. 2005-107972, filed on Nov. 11, 2005, in the Korean Intellectual Property Office, the disclosures of which are incorporated by reference herein in their entirety.

BACKGROUND OF THE INVENTION

1. Field of the Invention

Aspects of the present invention relate to a cathode catalyst for a fuel cell, and a membrane-electrode assembly for a fuel cell. More particularly, aspects of the present invention relate to a cathode catalyst having high catalytic activity, and a membrane-electrode assembly including the same.

2. Description of the Related Art

A fuel cell is a power generation system for producing electrical energy through an electrochemical redox reaction of an oxidant and hydrogen, particularly hydrogen, in a hydrocarbon-based material such as methanol, ethanol, or natural gas.

Such a fuel cell is a clean energy source that can replace fossil fuels. A typical fuel cell includes a stack composed of unit cells and produces various ranges of power output. Since a fuel cell has an energy density that is four to ten times higher than that of a small lithium battery, fuel cells have been promoted as small portable power sources.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has advantages of high energy density and high power, but also has problems such as the need to handle hydrogen gas carefully and the requirement for accessory facilities such as a fuel reforming processor for reforming methane or methanol, natural gas, and the like in order to produce the hydrogen that is used as the fuel gas.

On the other hand, a direct oxidation fuel cell has a lower energy density than a polymer electrolyte fuel cell, but has the advantages of easy handling of the polymer electrolyte fuel cell, a low operation temperature, and no requirement of additional fuel reforming processors.

In the above-mentioned fuel cell system, a stack that generates electricity typically includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

In a typical fuel cell system, fuel is supplied to an anode and is adsorbed on catalysts of the anode, where the fuel is oxidized to produce protons and electrons. The electrons are transferred to a cathode via an external circuit, thereby producing usable electricity, and the protons are transferred into the cathode through the polymer electrolyte membrane. In addition, an oxidant is supplied to the cathode. The oxidant, protons, and electrons are reacted on catalysts of the cathode to produce water.

SUMMARY OF THE INVENTION

One embodiment of the present invention provides a cathode catalyst for a fuel cell that has excellent activity.

Another embodiment of the present invention provides a method for preparing the cathode catalyst.

Yet another embodiment of the present invention provides a membrane-electrode assembly for a fuel cell including the cathode catalyst.

According to one embodiment of the present invention, a cathode catalyst for a fuel cell includes an RuSe alloy having an average particle size of less than or equal to 6 nm.

According to an aspect of the present invention, the RuSe alloy is an amorphous catalyst.

According to an aspect of the present invention, the cathode catalyst has a peak intensity ratio of carbon peak intensity with respect to ruthenium peak intensity ($I_{carbon\ peak}/I_{ruthenium\ peak}$) ranging from 0.4 to 1.5 in an X-ray diffraction pattern measured using a CuKα ray.

According to an aspect of the present invention, the cathode catalyst has an average particle size ranging from 3 to 5 nm.

According to an aspect of the present invention, the cathode catalyst includes 3 to 20 parts by weight of Se based on 100 parts by weight of Ru.

According to an aspect of the present invention, the cathode catalyst further includes a carrier, and includes 10 to 90 wt % of Ru based on the total weight of the catalyst.

According to an aspect of the present invention, the cathode catalyst further includes silica.

According to an aspect of the present invention, the cathode catalyst may include the silica in an amount of 0.001 to 1 part by weight based on 100 parts by weight of the RuSe alloy.

According to an aspect of the present invention, the cathode catalyst including the silica may further include a carrier in an amount of 90 to 99 wt % based on the total weight of the catalyst.

According to another aspect of the present invention, a cathode catalyst may further include a metal carbide.

According to an aspect of the present invention, the cathode catalyst may include the metal carbide in an amount of 10 to 50 parts by weight based on 100 parts by weight of the RuSe alloy.

According to an aspect of the present invention, the metal carbide may be represented by MC where M is a metal and the M and C have an atomic ratio ranging from 5 to 95:95 to 5. In one embodiment, the M and C have an atomic ratio ranging from 20 to 90:10 to 80.

According to an aspect of the present invention, the metal carbide may have an average particle size of 1 to 20 nm.

According to an aspect of the present invention, the metal carbide may be selected from the group consisting of WC, MoC, NbC, TaC, $M_1M_2C$ (where $M_1$ is a metal selected from the group consisting of Co, Mn, Fe, and combinations thereof, and $M_2$ is a metal selected from the group consisting of Cu, Ag, and combinations thereof), and combinations thereof.

According to an aspect of the present invention, the $M_1M_2C$ may include $M_1$, $M_2$, and C in an atomic ratio ranging from 35 to 70:15 to 25:5 to 50. In one embodiment, they may have an atomic ratio ranging from 45 to 55:15 to 20:25 to 40 among $M_1$, $M_2$, and C.

According to an aspect of the present invention, the metal carbide has a nanowire shape having an average particle diameter ranging from 1 to 20 nm and an average length ranging from 20 to 700 nm.

According to another embodiment of the present invention, a cathode catalyst for a fuel cell includes an RuSe alloy and a metal carbide.

According to another embodiment of the present invention, a method of preparing a catalyst includes drying a ruthenium solution including a water-soluble ruthenium precursor to obtain a first dried product; subjecting the first dried product to a first heat-treatment; adding an Se solution including a water-soluble Se precursor to the heat-treated product to obtain a mixture; drying the mixture to obtain a second dried product including ruthenium and Se; and subjecting the second dried product to a second heat-treatment.

According to an aspect of the present invention, the drying of the ruthenium solution is performed by a process including first drying of the ruthenium solution, and second drying of the first-dried product under vacuum. The drying of the mixture is performed by a process including third drying of the mixture, and fourth drying of the third-dried product under vacuum.

According to an aspect of the present invention, the first and second heat treatments are performed at a temperature of 100 to 450° C. The first and third drying processes are performed at a temperature of 70 to 90° C. for 2 to 30 hours. The second and fourth drying processes are performed for 4 to 9 hours.

According to an aspect of the present invention, the heat treatment is performed under a reducing gas atmosphere selected from the group consisting of a $H_2$ gas atmosphere, and a mixed gas atmosphere of $H_2$ and $N_2$.

According to another embodiment of the present invention, a method of preparing a catalyst includes subjecting a ruthenium solution including a water-soluble ruthenium precursor and silica to first drying to obtain a first dried product; subjecting the first dried product to a first heat-treatment; adding an Se solution including a water-soluble Se precursor to the heat-treated product to obtain a mixture; subjecting the mixture to second drying to obtain a second dried product including ruthenium and Se, subjecting the second dried product to a second heat-treatment; and removing silica from the heat-treated product.

According to an aspect of the present invention, the first and second dryings are performed at a temperature ranging from 50 to 120° C.

According to an aspect of the present invention, the first and second heat treatments are performed at a temperature ranging from 150 to 450° C.

According to an aspect of the present invention, the first and second dryings are performed for 1 to 5 hours. The silica may be removed from the heat-treated product by adding the heat-treated product to a solution selected from the group consisting of an HF solution, an NaOH solution, a KOH solution, and combinations thereof.

According to another embodiment of the present invention, there is provided a method of preparing a catalyst for a fuel cell, comprising combining a carbon-supported metal carbide with a ruthenium solution including a water soluble ruthenium precursor to form a first mixture; subjecting the mixture to a first drying to obtain a first dried product; subjecting the dried product to first heat-treatment to obtain a first heat treated product including carbon-supported ruthenium and metal carbide; preparing a second mixture by adding an Se solution including a water-soluble Se precursor to the heat-treated product; subjecting the second mixture to a second drying to obtain a second dried product including carbon-supported metal carbide, ruthenium and Se; and subjecting the second dried product to second heat-treatment to obtain a second heat-treated product.

According to another embodiment of the present invention, a cathode for a fuel cell including the catalyst is provided.

According to another embodiment of the present invention, a membrane-electrode assembly for a fuel cell including an anode and a cathode facing each other and a polymer electrolyte membrane interposed therebetween is provided. The cathode includes the cathode catalyst according to aspects of the present invention.

According to another embodiment of the present invention, a fuel cell system including an electricity generating element, which includes the membrane-electrode assembly including the cathode catalyst and a separator positioned at each side of the membrane-electrode assembly, a fuel supplier that supplies the electricity generating element with a fuel, and an oxidant supplier that supplies the electricity generating element with an oxidant, is provided.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
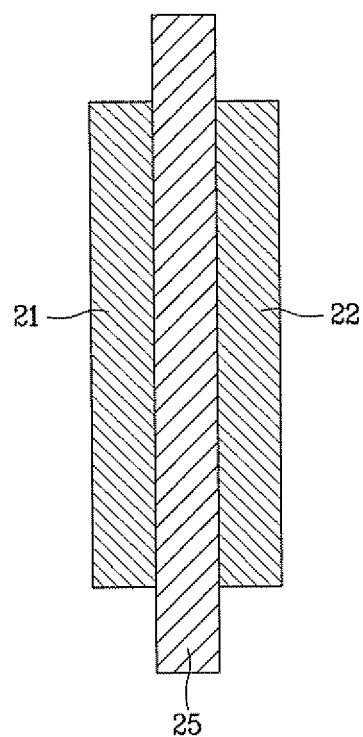
FIG. 1 is a schematic cross-sectional view showing a membrane-electrode assembly according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

This application claims priority to and the benefit of Korean Patent Application No. 10-2005-0107972 filed in the Korean Intellectual Property Office on Nov. 11, 2005, the entire content of which is incorporated herein by reference.

According to the one embodiment of the present invention, an Ru-containing cathode catalyst is provided instead of a platinum-based catalyst such as is generally used in a cathode. The Ru-containing catalyst has excellent activity and stability for an oxygen reduction reaction.

According to one embodiment of the present invention, the cathode catalyst is an RuSe catalyst. The catalyst has an average particle size of less than or equal to 6 nm and is an amorphous catalyst. Particularly, the RuSe catalyst has an improved catalytic activity and selectivity in comparison to platinum-based catalysts since the RuSe catalyst has no reactivity for an oxidation reaction of a fuel, particularly a hydrocarbon fuel. An amorphous catalyst provides more defect sites, which act as a catalyst active site, than a crystalline catalyst. Therefore, the amorphous RuSe catalyst has more improved catalytic activity than a crystalline RuSe catalyst.

The cathode catalyst has an average particle diameter of less than or equal to 6 nm, which is significantly smaller than a conventional platinum-based catalyst or a crystalline RuSe catalyst. In another embodiment, the cathode catalyst has an average particle diameter ranging from 3 to 5 nm. The smaller particle diameter causes an increase in catalyst active surface areas, and thereby improves catalyst activity.

When the cathode catalyst includes a carbon carrier, the cathode catalyst has a peak intensity ratio of carbon peak intensity with respect to the ruthenium peak intensity ($I_{carbon\,peak}/I_{ruthenium\,peak}$) ranging from 0.4 to 115 in an X-ray diffraction pattern measured using a CuKα ray. Herein, the carbon is carbon black. When the peak intensity ratio is less than 0.4, amorphous properties may be too great to obtain stability, whereas when the peak intensity ratio is more than 1.5, the crystallinity may be too high to increase the catalyst activity.

The cathode catalyst includes 3 to 20 parts by weight of Se based on 100 parts by weight of Ru. When the Se content is less than 3 parts by weight, catalyst activity may decrease, and resistance to reactivity with a fuel, particularly a hydrocarbon fuel such as methanol, may decrease. When the Se content is more than 20 parts by weight, active sites of Ru may decrease.

The cathode catalyst may be used in the form of a catalytic metal by itself (black catalyst), or can be used while being supported on a carrier. The carrier may include carbon such as activated carbon, denka black, ketjen black, acetylene black, or graphite. When the cathode catalyst is supported on a carrier, Ru is included in an amount of 10 to 90 wt % based on the total weight of the catalyst. When Ru is included in an amount less than 10 wt %, catalytic active components may not be sufficiently provided, whereas when the amount of Ru is more than 90 wt %, electrical conductivity of the catalyst is not sufficient. When the cathode catalyst is supported on a carrier, the Se content may also be 3 to 20 parts by weight based on 100 parts by weight of Ru.

According to another embodiment of the present invention, the cathode catalyst may include silica in a very small amount. The silica increases the dispersibility of Ru, and thereby makes the catalyst highly supported while the catalyst is prepared.

In other words, since the Ru tends to be easily clustered among the particles, it is difficult for the Ru to be highly supported. Herein, the silica increases the dispersibility of the Ru and thereby decreases its particle size. However, the silica that is added during the process of preparing the cathode catalyst is mostly but not completely removed and so is included therein in a small amount.

The cathode catalyst may include the silica in an amount of 0.001 to 1 part by weight based on 100 parts by weight of the RuSe alloy. Alternatively, the cathode catalyst may include silica in an amount of 0.001 to 5 parts by weight. When the silica is included in an amount of less than 0.001 part by weight based on 100 parts by weight of the RuSe alloy, the silica may be hard to remove. On the contrary, when the silica is included in an amount of more than 1 part by weight, the silica may decrease catalyst activity.

The cathode catalyst further includes a carrier, and the RuSe alloy is present in an amount of 90 to 99 wt % based on the entire weight of a catalyst. For example, the RuSe alloy can be supported up to 90 to 99 wt % by using silica during the preparation of the cathode catalyst.

According to another embodiment of the present invention, a cathode catalyst further includes a metal carbide. Since a metal carbide has a similar electronic structure to a noble metal such as Pt, Ru, or the like, the metal carbide can cooperate with the RuSe alloy in a cathode catalyst, and thereby improve catalyst activity.

In addition, since the cathode catalyst has a less expensive precursor than Pt and can be prepared by a simple method, the cathode catalyst can be prepared much more cheaply than a Pt-based catalyst.

In addition, the cathode catalyst can have activity under an acidic or base environment due to the synergistic working of the metal carbide and the RuSe alloy.

The cathode catalyst may include the metal carbide in an amount of 10 to 50 parts by weight based on 100 parts by weight of the RuSe alloy. When the metal carbide is included within this range, the metal carbide may have an excellent synergistic working with the RuSe alloy, so that a catalyst can have highly-improved activity.

The metal carbide may be represented by MC, where M is a metal and C is carbon. The M and C may have an atomic ratio ranging from 5 to 95:95 to 5. In one embodiment, the M and C may have an atomic ratio ranging from 20 to 90:10 to 80. When the M and C are included within this atomic ratio, the carbon can effectively prevent the metal from being dissolved under an acidic environment.

The metal carbide may have an average particle size ranging from 1 to 20 nm. When the metal carbide has an average particle size smaller than 1 nm, it may be difficult to prepare a catalyst. When it has an average particle size of larger than 20 nm, the catalyst may have a decreased surface area, thereby having decreased activity.

The metal carbide may be selected from the group consisting of WC, MoC, NbC, TaC, $M_1M_2C$ (where $M_1$ is a metal selected from the group consisting of Co, Mn, Fe, and combinations thereof, and $M_2$ is a metal selected from the group consisting of Cu, Ag, and combinations thereof), and combinations thereof.

The metal carbide may have a nanowire shape. When the metal carbide has a nanowire shape, the metal carbide has a large active surface area and a small particle size, and can thereby have improved activity.

The metal carbide has an average particle diameter ranging from 1 to 20 nm and an average length ranging from 20 to 700 nm. When the metal carbide has an average particle diameter and average length of less than this range, it may be difficult to prepare the metal carbide. On the other hand, when the metal carbide has an average particle diameter and average length of more than the range, the metal carbide may have a small active surface area and large particles and thereby, not much improved activity.

The cathode catalyst for a fuel cell according to one embodiment may be prepared as follows.

First, a water-soluble ruthenium precursor is added to a solvent. As non-limiting examples, the water-soluble ruthenium precursor may include $RuCl_3$ hydrate, ruthenium acetyl acetonate ($Ru(C_5H_7O_2)_3$), ruthenium carbonyl ($Ru_3(CO)_{12}$), or combinations thereof and the solvent may be water, acetone, or an alcohol such as methanol or ethanol.

During the above process, a carrier may be further added to prepare a carrier-supported catalyst. The carrier may include a carrier described above.

The mixture of the water-soluble ruthenium precursor, solvent and carrier, if present, is dried. The drying process is performed by a process including subjecting the mixture to a first drying, and then subjecting the first-dried product to a second drying under vacuum.

The first drying process may be performed at a temperature of 70 to 90° C. for 2 to 30 hours. The second drying process may be performed by placing the first-dried product under vacuum for 4 to 9 hours and may be performed at a temperature appropriate for decomposing the water-soluble ruthenium precursor. For example, when the water-soluble ruthenium precursor is $RuCl_3$ hydrate, the drying temperature may be more than or equal to 140° C. For example, the second drying temperature may be about 200° C.

The dried mixture is then subjected to a first heat treatment. The first heat treatment is performed at a temperature of 100 to 450° C. The heat treatment is performed under a reducing gas atmosphere selected from the group consisting of an $H_2$ gas atmosphere, and a mixed gas atmosphere of $H_2$ and $N_2$. The mixed $H_2$ and $N_2$ gases include $H_2$ and $N_2$ in any suitable volume ratio. For example, there need be no upper limit in the volume ratio of $H_2$ to $N_2$, since the gas atmosphere can be entirely hydrogen. On the lower limit, the volume ratio of $H_2$ to $N_2$ is typically not less than 1:3.

An Se solution including a water-soluble Se precursor is added to the heat-treated product. The Se solution is prepared by mixing a water-soluble Se precursor such as selenous acid ($H_2SeO_3$) to a solvent such as acetone, an alcohol including methanol or ethanol, or water.

The mixture is dried again. The drying of the mixture may be performed by a process including subjecting the mixture to a third drying, and subjecting the third-dried product to a fourth drying under vacuum. The third drying process may be performed at a temperature of 70 to 90° C. for 2 to 30 hours. The fourth drying process may performed by placing the third-dried product under vacuum for 4 to 9 hours at a temperature appropriate for decomposing the water-soluble selenium precursor. For example, when the water-soluble selenium precursor is selenous acid ($H_2SeO_3$), the drying temperature may be more than or equal to 140° C., and as a specific, non-limiting example, may be about 200° C.

The mixture is subjected to second heat treatment to prepare a catalyst. The second heat treatment may be performed at a temperature of 100 to 450° C. The heat treatment is performed under a reducing gas atmosphere selected from the group consisting of $H_2$ gas atmosphere, and a mixed gas atmosphere of $H_2$ and $N_2$. The mixed $H_2$ and $N_2$ gases include $H_2$ and $N_2$ in any suitable volume ratio. For example, there need be no upper limit in the volume ratio of $H_2$ to $N_2$, since the gas atmosphere can be entirely hydrogen. On the lower limit, the volume ratio of $H_2$ to $N_2$ is typically not less than 1:3.

According to another embodiment of the present invention, the cathode catalyst can be prepared in the following method.

First, a ruthenium solution including a ruthenium water-soluble precursor and silica is primarily dried to prepare a dry product including ruthenium. The cathode catalyst is prepared from the ruthenium water-soluble precursor and carrier in the same method as described above.

The primary drying can be performed at a temperature ranging from 50 to 120° C. When the primary drying is performed at a temperature of lower than 50° C., the solvent may not evaporate well, so that it may take a long time to produce a dry product. When the primary drying is performed at a temperature of higher than 120° C., dry particles may become clustered into a bigger particle.

The ruthenium-containing dry product is primarily heat-treated, providing a ruthenium-containing heat-treated product. The primary heat-treatment may be performed at a temperature ranging from 150 to 450° C. for 1 to 5 hours. When the primary heat-treatment is performed at a temperature lower than 150° C., a precursor may not completely decompose. When the primary heat-treatment is performed at a temperature higher than 450° C., product particles may become clustered into bigger particles. The reduction gas atmosphere in the primary heat-treatment is the same that in the method of preparing a cathode catalyst describe above.

The ruthenium-containing heat-treated product is mixed with an Se solution including an Se water-soluble precursor. Herein, the Se water-soluble precursor is the same as that described above.

The mixture is secondarily dried, providing a ruthenium and Se-containing dry product. The secondary drying step can be performed at a temperature ranging from 50 to 120° C. When the secondary drying is performed at a temperature lower than 50° C., the solvent may not evaporate well, so that it may take a long time to provide a dry product. When the secondary drying is performed at a temperature higher than 120° C., dry product particles may become clustered into bigger particles.

The ruthenium and Se-containing dry product is secondarily heat-treated to provide a heat-treated product. The secondary heat treatment may be performed at a temperature ranging from 150 to 450° C. for 1 to 5 hours.

When the secondary heat treatment is performed at a temperature lower than 150° C., the precursor may not completely decompose. When the secondary heat treatment is performed at a temperature higher than 450° C., product particles may become clustered into bigger particles. In addition, when the secondary heat treatment time is less than 1 hour, the precursor may not completely decompose. When the secondary heat treatment time is longer than 5 hours, product particles may become clustered into bigger particles.

The reduction gas atmosphere in the secondary heat treatment is the same as that used in preparing a cathode catalyst as described above.

The ruthenium and Se-containing heat-treated product may be treated with a solution selected from the group consisting of an HF solution, an NaOH solution, a KOH solution, and combinations thereof. However, since the silica cannot be completely removed, silica may remain in the cathode catalyst in an amount of 0.001 to 1 part by weight based on 100 parts by weight of an RuSe alloy.

An Ru and Se-containing catalyst as described above may be used for a cathode and a conventional platinum-based catalyst may be used for an anode. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof, and combinations thereof. More specifically, non-limiting examples of the platinum-based catalyst are selected from the group consisting of Pt, Pt/Ru, Pt/V, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or a metal supported in a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. Typically, carbon may be used.

The cathode and anode catalysts are disposed on electrode substrates. The electrode substrates support the anode and cathode, respectively, and provide a path for transferring fuel and oxidant to the catalyst layer. As for the electrode substrates, a conductive substrate is used, such as, for example a carbon paper, a carbon cloth, a carbon felt, or a metal cloth (a porous film including a metal cloth fiber or a metalized polymer fiber), but the conductive substrate is not limited thereto.

The electrode substrate may be treated with a fluorine-based resin to be water-repellent, which can prevent a decrease in reactant diffusion efficiency due to water generated during a fuel cell operation. The fluorine-based resin may include polyvinylidene fluoride, polytetrafluoroethylene, fluorinated ethylene propylene, polychlorotrifluoro ethylene, a fluoroethylene polymer, or copolymers thereof, but is not limited thereto.

A microporous layer (MPL) can be added between the aforementioned electrode substrates and catalyst layer to increase reactant diffusion effects. The microporous layer generally includes conductive powders with a particular particle diameter. The conductive material may include, but is not limited to, carbon powder, carbon black, acetylene black, activated carbon, carbon fiber, fullerene, nanocarbon, or combinations thereof. The nanocarbon may include a material such as carbon nanotubes, carbon nanofiber, carbon nanowire, carbon nanohorns, carbon nanorings, or combinations thereof.

The microporous layer is formed by coating a composition comprising a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol and so on, water, dimethyl acetamide, dimethyl sulfoxide, N-methylpyrrolidone, and tetrahydrofuran.

The coating method used in forming the microporous layer may include, but is not limited to, screen printing, spray coating, doctor blade methods, gravure coating, dip coating, silk screening, painting, and so on, depending on the viscosity of the composition.

According to another embodiment, a membrane-electrode assembly includes a cathode and an anode, and a polymer electrolyte membrane between the cathode and anode. FIG. 1 is a schematic cross-sectional view showing a membrane-electrode assembly 20 according to an embodiment of the present invention. Referring to FIG. 1, reference numeral 21 denotes a cathode, reference numeral 22 denotes an anode, and reference numeral 25 denotes a polymer electrolyte membrane.

The polymer electrolyte membrane 25 plays a role of exchanging ions by transferring protons produced at an anode catalyst layer to a cathode catalyst layer. The proton conductive polymer for the polymer electrolyte membrane of the present invention may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly (2,5-benzimidazole). The polymer electrolyte membrane generally has a thickness ranging from 10 to 200 μm.

According to another embodiment of the present invention, a fuel cell system including the above membrane-electrode assembly is provided. The fuel cell system includes at least one of an electricity generating element, a fuel supplier, and an oxidant supplier.

As non-limiting examples, the fuel cell system may be a polymer electrolyte membrane fuel cell (PEMFC), a direct oxidation fuel cell (DOFC), or a mixed reactant fuel cell. A mixed reactant fuel cell includes a catalyst at an anode catalyst layer, which optionally acts only for oxidation of a fuel, and another catalyst at a cathode catalyst layer, which optionally acts only for reduction of an oxidant. Therefore, even if the fuel and oxidant mixture is provided to the anode and cathode catalyst layers, only oxidation of the fuel occurs at the anode catalyst layer, while only reduction of the oxidant occurs at a cathode catalyst layer.

The electricity generating element includes a membrane-electrode assembly and separators disposed at each side of the membrane-electrode assembly. The electricity generating element generates electricity through oxidation of a fuel and reduction of an oxidant.

The fuel supplier supplies the electricity generating element with a fuel that includes hydrogen, and the oxidant supplier supplies the electricity generating element with an oxidant such as oxygen or air. As non-limiting examples, the fuel may be liquid or gaseous hydrogen, or a hydrocarbon-based fuel such as methanol, ethanol, propanol, butanol, or natural gas.

Figure 2:
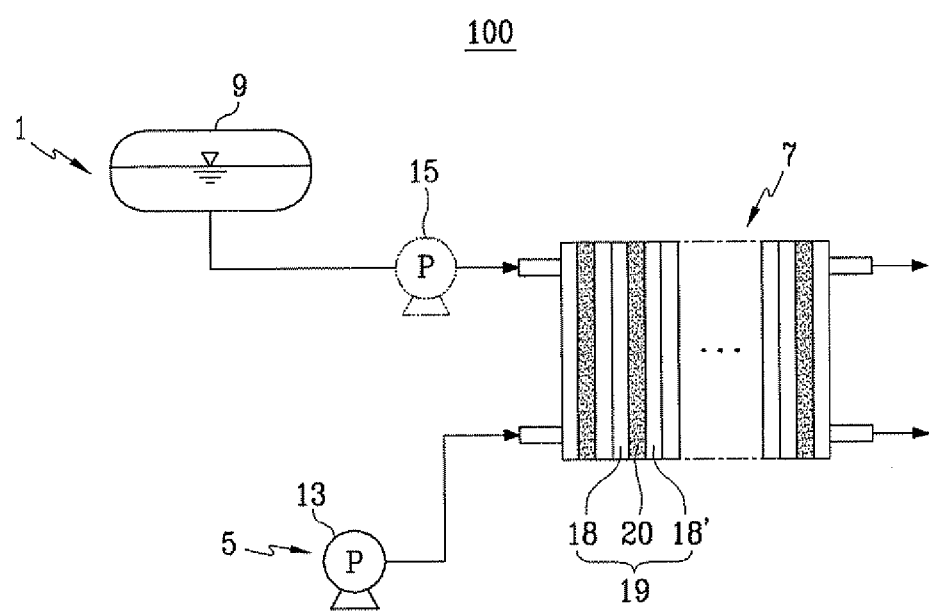
FIG. 2 is a schematic diagram showing the structure of a fuel cell system according to another embodiment of the present invention.

FIG. 2 schematically illustrates a fuel cell system 100 wherein a fuel and an oxidant are provided to an electricity generating element 19 through pumps 13 and 15, but the present invention is not limited to such a structure. Alternatively, the fuel cell system according to aspects of the present invention may include a structure wherein a fuel and an oxidant are provided by diffusion.

The fuel cell system 100 includes at least one electricity generating element 19 that generates electrical energy through an electrochemical reaction of a fuel and an oxidant, a fuel supplier 1 that supplies a fuel to the electricity generating element 19, and an oxidant supplier 5 that supplies the oxidant to the electricity generating element 19.

In addition, the fuel supplier 1 is equipped with a tank 9, which stores fuel, and a fuel pump 15, which is connected therewith. The fuel pump 15 supplies the fuel stored in the tank 9 with a predetermined pumping power.

The oxidant supplier 5, which supplies the electricity generating element 19 with the oxidant, is equipped with at least one pump 13 that supplies the oxidant with a predetermined pumping power.

The electricity generating element 19 includes a membrane-electrode assembly 20 that oxidizes hydrogen or a fuel and reduces an oxidant, separators 18 and 18' that are respectively positioned at opposite sides of the membrane-electrode assembly 20 and supply hydrogen or a fuel, and an oxidant. At least one electricity generating element 19 is stacked to form a stack 7.

The following examples illustrate aspects of the present invention in more detail. However, it is understood that the present invention is not limited by these examples.

Example 1

1 g of $RuCl_3$ hydrate was dissolved in 2 ml of acetone to prepare a solution. Then, 1 g of a carbon carrier was added to the solution. The mixture was dried at 70° C. under a normal atmosphere for 24 hours and thereafter, at 140° C. under vacuum for 4 hours. The dried sample was heat-treated under a mixed $H_2$ and $N_2$ gas atmosphere (1:1 volume ratio) at 300° C. for 4 hours to prepare Ru/C (Ru supported on the carbon carrier).

Subsequently, 0.075 g of $H_2SeO_3$ was dissolved in 3 ml of acetone to prepare a solution. The solution was added onto the Ru/C. The resulting product was dried at 70° C. under a normal atmosphere for 24 hours and then, at 140° C. under vacuum for 4 hours. The dried sample was heat-treated under a mixed $H_2$ and $N_2$ gas atmosphere (1:1 volume ratio) at 300° C. for 4 hours to prepare a cathode catalyst for a fuel cell.

Example 2

A cathode catalyst was prepared according to the same method as in Example 1, except that 0.03 g of $H_2SeO_3$ was used instead of 0.075 g of $H_2SeO_3$.

Example 3

A cathode catalyst was prepared according to the same method as in Example 1, except for using 5.4 g of $RuCl_3$ hydrate instead of 1 g of $RuCl_3$ hydrate and also, 0.375 g of $H_2SeO_3$ instead of 0.075 g of $H_2SeO_3$.

Example 4

A cathode catalyst was prepared according to the same method as in Example 1, except for using 0.74 g of $RuCl_3$ hydrate instead of 1 g of $RuCl_3$ hydrate and also, 0.06 g of $H_2SeO_3$ instead of 0.075 g of $H_2SeO_3$.

Example 5

0.6 g of ruthenium carbonyl was dissolved in 150 ml of benzene. Then, 1 g of a carbon carrier was added to the solution. The mixture was agitated at 120° C. for 24 hours while refluxing, followed by filtration. The filtered product was washed with distilled water and then dried at 80° C. for 12 hours. The dried sample was heat-treated under a $H_2$ gas atmosphere at 250° C. for 3 hours to prepare Ru/C (Ru is supported on the carbon carrier).

Subsequently, 0.075 g of $H_2SeO_3$ was dissolved in 3 ml of acetone to prepare a solution. The solution was added onto the Ru/C. The resulting product was dried at 70° C. under a normal atmosphere for 24 hours and then, at 140° C. under vacuum for 4 hours. The dried sample was heat-treated under a mixed $H_2$ and $N_2$ gas atmosphere (a volume ratio of 1:1) at 300° C. for 4 hours to prepare a cathode catalyst for a fuel cell.

Example 6

A cathode catalyst was prepared according to the same method as in Example 1 except for using 1.0 g of ruthenium acetyl acetonate instead of 0.6 g of ruthenium carbonyl.

Comparative Example 1

A cathode catalyst was prepared according to the same method as in Example 1 except for using 0.06 g of Se instead of 0.075 g of $H_2SeO_3$.

Comparative Example 2

A cathode catalyst was prepared according to the same method as in Example 1, except that 1.0 g of $H_2SeO_3$ was used instead of 0.075 g of $H_2SeO_3$.

Comparative Example 3

A cathode catalyst was prepared according to the same method as in Example 1 except for using 0.074 g of $RuCl_3$ hydrate instead of 1 g of $RuCl_3$ hydrate and 0.0075 g of $H_2SeO_3$ instead of 0.075 g of $H_2SeO_3$.

Comparative Example 4

A cathode catalyst was prepared according to the same method as in Example 1 except for using 97 g of $RuCl_3$ hydrate instead of 1 g of $RuCl_3$ hydrate and also, 7.2 g of $H_2SeO_3$ instead of 0.075 g of $H_2SeO_3$.

Figure 3:
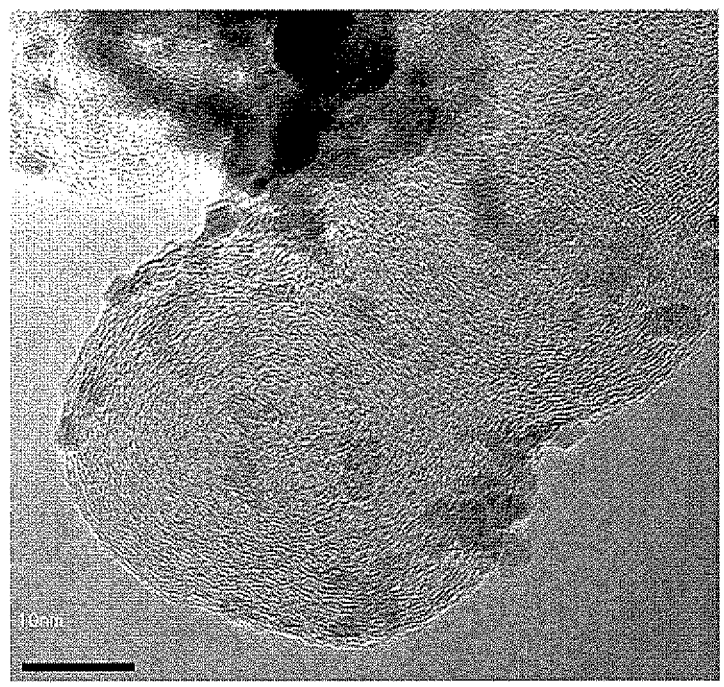
FIG. 3 is a transmission electron microscope (TEM) photograph of a cathode catalyst according to Example 1.
Figure 4:
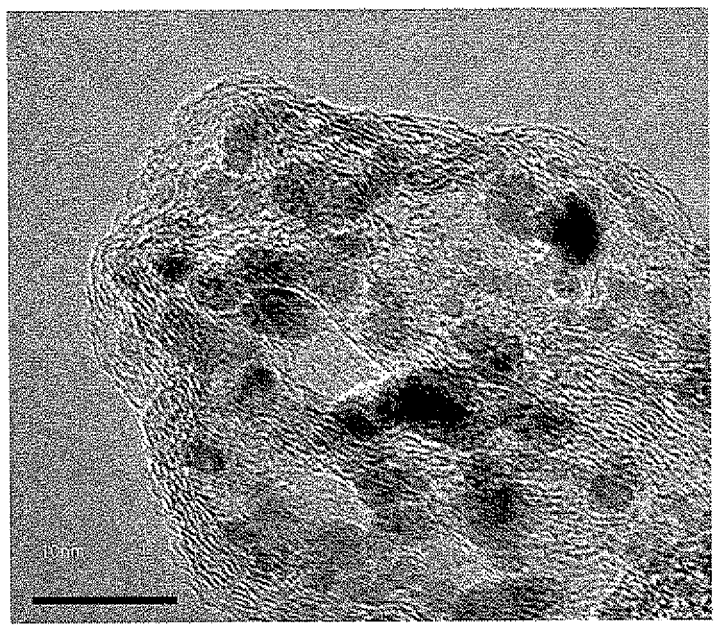
FIG. 4 is a TEM photograph of a cathode catalyst according to Example 2.

The are taken a Transmission electron microscope (TEM) photographs of the cathode catalysts according to Examples 1 and 2 are shown in FIGS. 3 and 4. Referring to FIGS. 3 and 4, the darkest parts indicate RuSe. Based on the scale bar of FIGS. 3 and 4 representing 10 nm, it can be seen that the cathode catalyst of Examples 1 and 2 has a size ranging from 2 to 4 nm.

Figure 5:
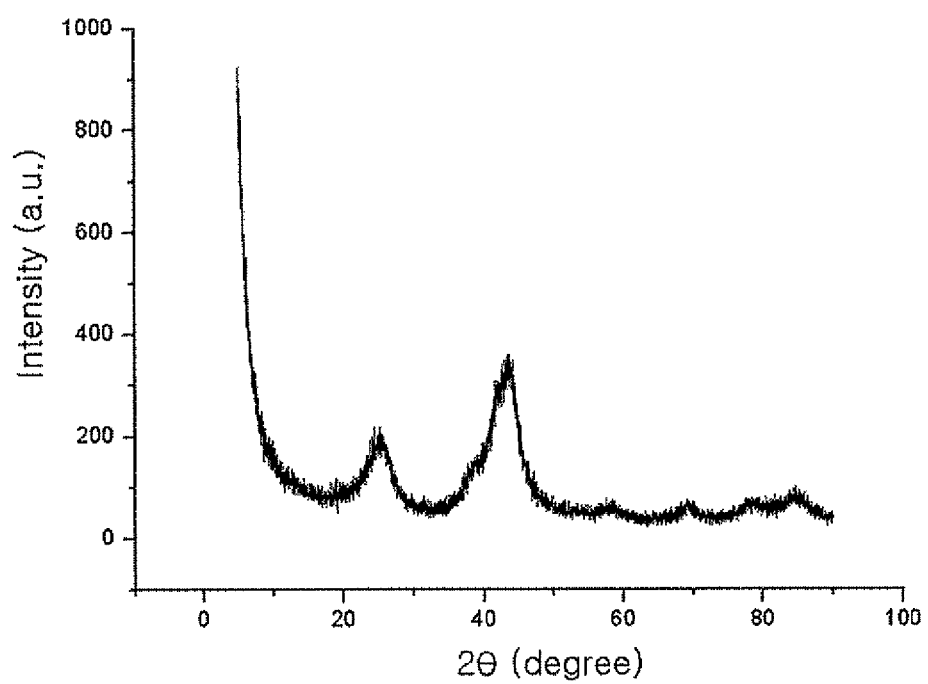
FIG. 5 is a graph showing X-ray diffraction peaks of the cathode catalyst according to Example 1.
Figure 6:
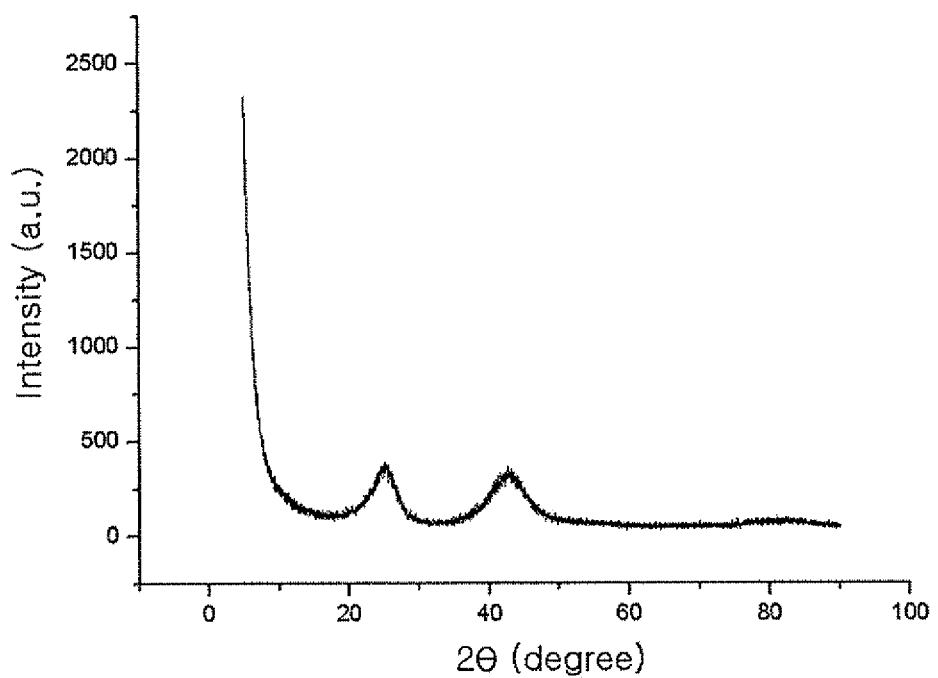
FIG. 6 is a graph showing X-ray diffraction peaks of the cathode catalyst according to Example 2.
Figure 7:
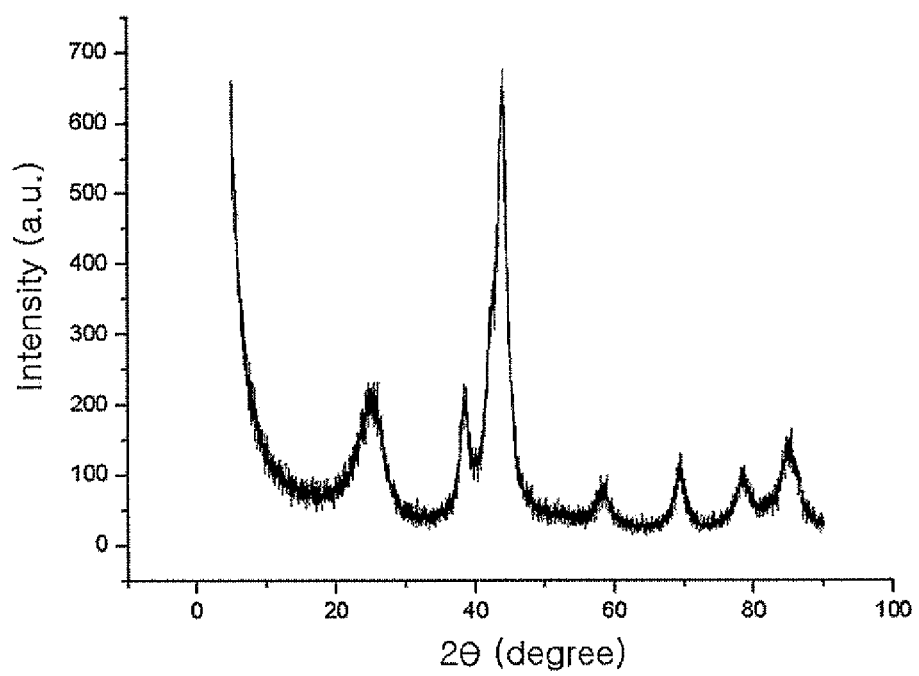
FIG. 7 is a graph showing X-ray diffraction peaks of the cathode catalyst according to Comparative Example 1.

X-ray diffraction peaks of the catalyst powders according to Examples 1 and 2 and Comparative Example 1 are respectively shown in FIGS. 5 to 7. The X-ray diffraction peaks were measured by using a CuKα ray at a scan rate of 0.05 deg/sec. As shown in FIGS. 5 to 7, the catalysts according to Examples 1 and 2 do not have a sharp X-ray diffraction peak and the peaks are smaller than those of Comparative Example 1. It can therefore be concluded that the catalysts according to Examples 1 and 2 are more amorphous than the catalyst according to Comparative Example 1.

From the X-ray diffraction peaks of the catalysts according to Examples 1 and 2 and Comparative Example 1, relative ratios of carbon peaks and ruthenium peaks were calculated. The results are shown in Table 1. Herein, larger $I_{carbon\ peak}/I_{ruthenium\ peak}$ values indicate a greater amorphous ruthenium content. The results of the following Table 1 show that the cathode catalysts of Examples 1 and 2 include more amorphous ruthenium than that of Comparative Example 1.

TABLE 1

| | $I_{carbon\ peak}/I_{ruthenium\ peak}$ |
|---|---|
| Example 2 | 1.01 |
| Example 1 | 0.56 |
| Comparative Example 1 | 0.35 |

Figure 8:
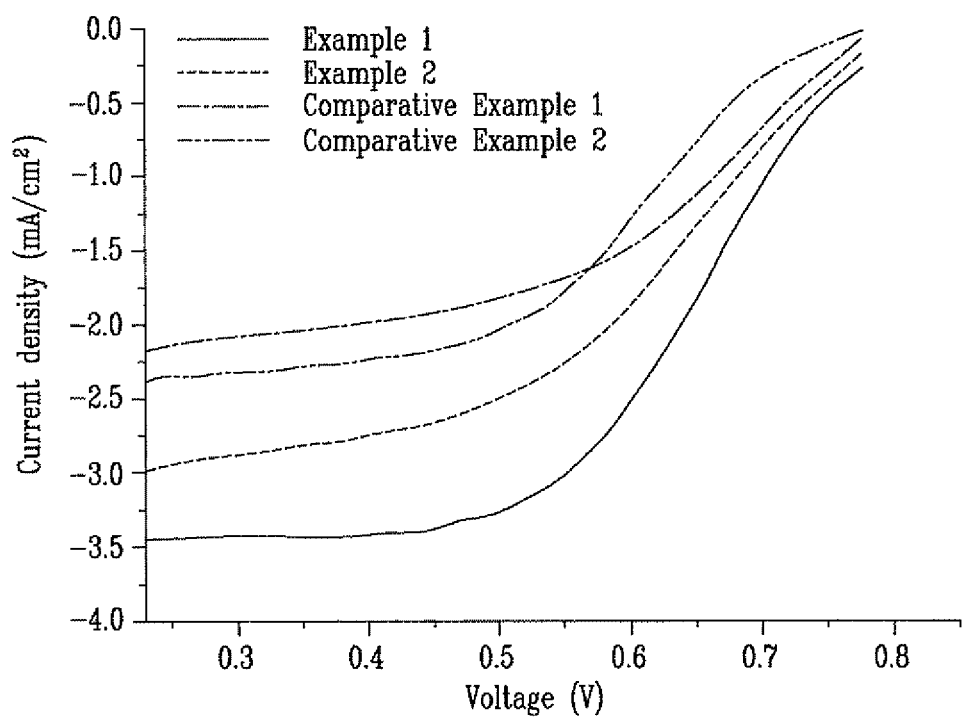
FIG. 8 is a graph showing catalyst activity of the cathode catalysts according to Examples 1 and 2, and Comparative Examples 1 and 2, measured using a rotating disk electrode (RDE)
Figure 9:
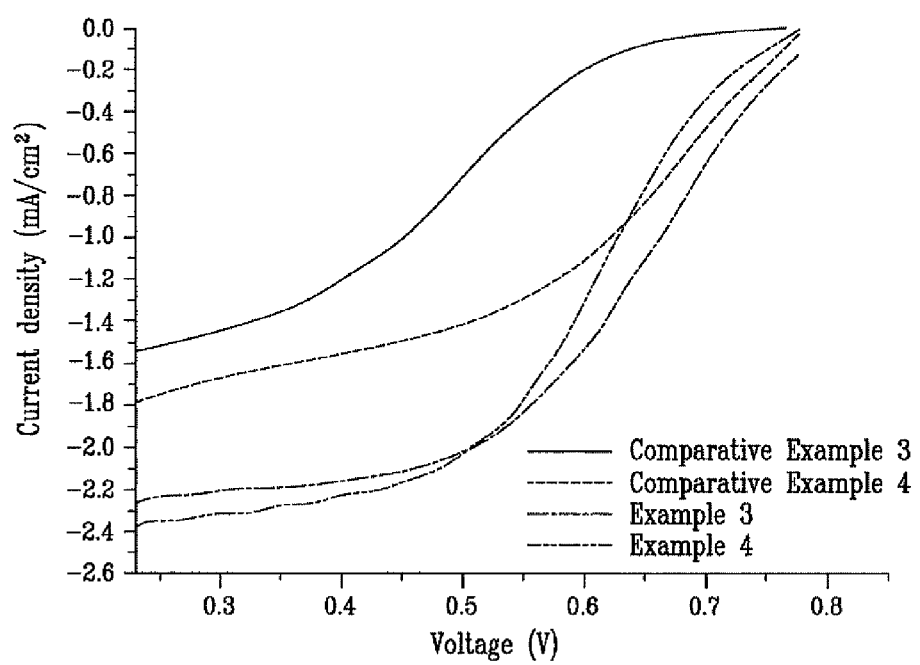
FIG. 9 is a graph showing catalyst activity of the cathode catalysts according to Examples 3 and 4, and Comparative Examples 3 and 4, measured using an RDE.
Figure 10:
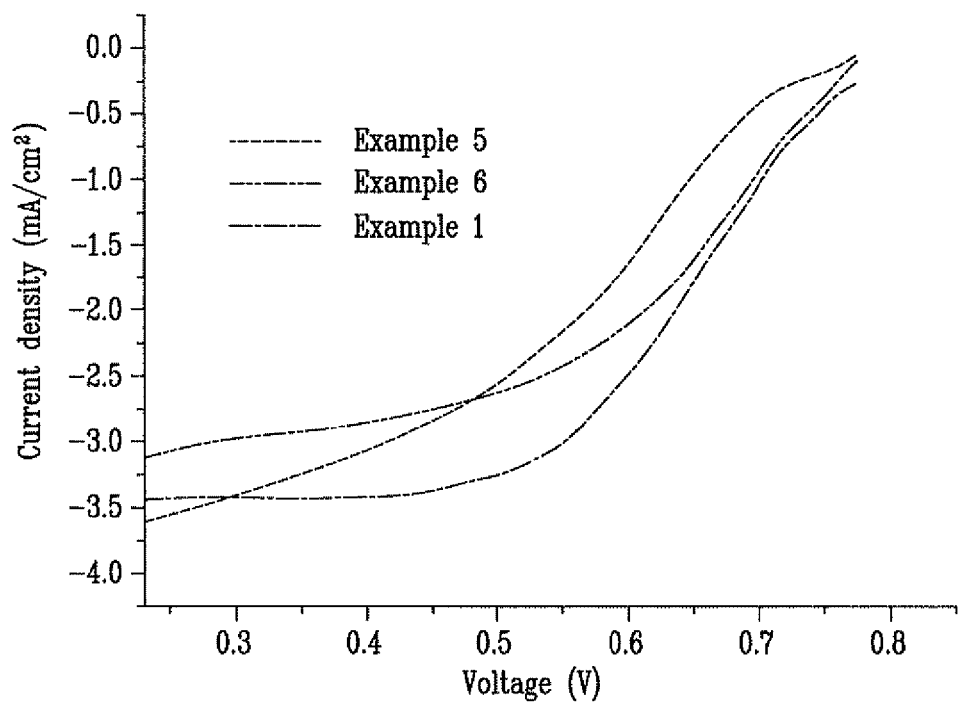
FIG. 10 is a graph showing catalyst activity of the cathode catalysts according to Examples 1, 5, and 6 measured using an RDE.

The catalytic activities of the catalysts according to Examples 1 to 6 and Comparative Examples 1 and 2 were measured using a rotating disk electrode (RDE). Ag/AgCl was used as a reference electrode, Pt was used as a counter electrode, and a 0.5M sulfuric acid solution was used. The activity was measured at a scan rate of 10 mV/s and a rotating speed of 2000 rpm. FIGS. 8 to 10, respectively, show the results.

As shown in FIG. 8, the amorphous catalysts according to Examples 1 and 2 are more effective than the crystalline catalysts according to Comparative Examples 1 and 2.

As shown in FIG. 9, the catalysts according to Examples 3 and 4 are more effective than the catalysts according to Comparative Examples 3 and 4.

As shown in FIG. 10, the catalytic activity of catalysts according to Examples 1, 5, and 6 varied only a little depending on the kind of catalyst precursor.

Therefore, since an amorphous RuSe catalyst cathode catalyst according to aspects of the present invention provides more defect sites working as an active site than a crystalline catalyst, it can have a much better activity than a crystalline RuSe catalyst.

Example 7

1.56 g of ruthenium chloride was dissolved in 20 ml of water to prepare a ruthenium aqueous solution. Then, 0.05 g of a carbon carrier and 20 g of silica were added to the ruthenium aqueous solution, preparing a ruthenium solution. The ruthenium solution was agitated for 24 hours at a room temperature and dried at 90° C., preparing a dry product including ruthenium. The ruthenium-containing dry product was heat-treated under a hydrogen atmosphere at 300° C. for 3 hours, preparing a ruthenium-containing heat-treated product. 1 g of the ruthenium-containing heat-treated product and 0.1 g of $H_2SeO_3$ were added to 10 ml of acetone to prepare a mixture. The mixture was agitated at 90° C. and dried, preparing a ruthenium and Se-containing dry product. The ruthenium and Se-containing dry product was heat-treated under a hydrogen atmosphere at 300° C. for 3 hours, preparing a powder. The powder was added to 1 ml of water. The mixture was agitated, and then, 200 ml of HF was added thereto. The resulting mixture was agitated for 24 hours. The agitated solution was filtrated, providing an RuSe/C powder.

The prepared RuSe/C had a particle size of 4.5 nm and included 0.4 parts by weight of silica based on 100 parts by weight of RuSe and 97 wt % of the RuSe alloy based on the entire weight of a cathode catalyst.

Comparative Example 5

0.6 g of ruthenium carbonyl, 0.03 g of Se, and 19 of carbon were added to 150 ml of toluene to prepare a mixture. The mixture was mixed at 140° C. for 24 hours, then, filtrated, and dried at 80° C., preparing a powder. The powder was heat-treated under a hydrogen atmosphere at 250° C. for 3 hours, preparing a catalyst.

The catalysts according to Example 7 and Comparative Example 5 were measured for catalytic activity using an RDE as described above. The results are shown in the following Table 2.

TABLE 2

| | current density (mA/cm$^2$) |
|---|---|
| Example 7 | 1.72 |
| Comparative Example 5 | 0.43 |

Referring to Table 2, the cathode catalyst of Example 7 had much greater activity than the cathode catalyst of Comparative Example 5. without being bound to a particular theory, it is believed that the reason for the greater results with respect of the cathode catalyst of Example 7 is that since the cathode catalyst of Example 7 included silica, RuSe is highly supported in an amount of 97 wt % based on the entire weight of a catalyst.

Example 8

1 g of W powder was mixed with 10 ml of 30% $H_2O_2$, 2 ml of isopropanol, and 10 ml of water. The mixture was agitated for 24 hours, preparing a mixed solution. Then, 1 g of carbon was added to the mixed solution. The resulting product was treated with an ultrasonic wave, preparing a powder. The powder was heat-treated in a micro-oven for 10 minutes to prepare tungsten carbide/carbon (WC/C). The WC had an atomic ratio of 1:1 between the W and the C.

Then, 1 g of WC/C and 3 g of $RuCl_3$ were added to 15 ml of ethanol. The mixture was mixed for 3 hours, preparing a mixed solution. The mixed solution was treated with an ultrasonic wave to evaporate the ethanol, preparing a powder. The powder was heat-treated at 250° C. for 3 hours by flowing $H_2$ and $N_2$ gas mixed in a volume ratio of 1:1 at a speed of 300 ml/min, preparing an Ru—WC/C product.

Then, 0.075 g of $H_2SeO_3$ was dissolved in 3 ml of acetone to prepare a solution. The solution was added onto the Ru—WC/C. The resulting product was dried at 70° C. under a normal atmosphere for 24 hours and then, at 140° C. under vacuum for 4 hours. The dried sample was heat-treated under a mixed $H_2$ and $N_2$ gas atmosphere (1:1 volume ratio) at 300° C. for 4 hours to prepare an RuSe—WC/C cathode catalyst.

In the RuSe—WC/C catalyst, the RuSe alloy had an atomic ratio of 65:35 between Ru and Se. In addition, the WC was included in an amount of 30 parts by weight based on 100 parts by weight of the RuSe alloy. The RuSe had a particle size of 4.5 nm, and the WC had a particle size of 10 nm.

Example 9

3.6 g of cobalt nitrate, 2.31 g of copper nitrate, 4 g of polyethylene glycol, and 1 g of carbon were added to 40 ml of water and then, mixed together for 24 hours at a room temperature, preparing a mixed solution. The mixed solution was dried at 90° C. to evaporate the solvent, preparing a powder. The powder was heat-treated under a nitrogen atmosphere at 600° C. for 3 hours to prepare CoCuC/C.

Then, an RuSe—CoCuC/C catalyst was prepared according to the same method as in Example 8 except for using the CoCuC/C instead of the WC/C. The CoCuC had an atomic ratio of 58:21:21 among the Co, Cu, and C and an average particle size of 5.5 nm.

Example 10

1.5 g of molybdenum acetate and 20 g of mesoporous silica were dissolved in 20 ml of water and then, agitated at a room temperature for 24 hours, preparing a mixed solution. The mixed solution was dried at 90° C. to evaporate the water, preparing a powder. The powder was heat-treated under a CH₄ atmosphere at 700° C. for 3 hours, preparing MoC/SiO₂.

Then, 1 g of the MoC/SiO₂ and 200 ml of HF were added to 1 ml of water and agitated for 24 hours to remove the silica. The resulting product was filtrated to prepare nanowire-shaped MoC. The nanowire-shaped MoC had an atomic ratio of 85, 15 between the Mo and the C, an average particle diameter of 7 nm, and an average length of 50 nm.

Then, an RuSe—MoC/C catalyst was prepared according to the same method as in Example 8 except for using the nanowire-shaped MoC instead of the WC/C.

The CoCuC/C catalyst of Example 9 and the nanowire-shaped MoC/C catalyst of Example 10 were measured for activity using an RDE as described above. The result is shown in the following Table 3.

TABLE 3

|  | current density (mA/cm²) |
|---|---|
| CoCuC/C (Example 9) | 1.35 |
| MoC/C (Example 10) | 1.72 |
| Comparative Example 5 | 0.43 |

Referring to Table 3, the CoCuC/C catalyst of Example 9 and the nanowire-shaped MoC/C catalyst of Example 10 had much greater activity than the catalyst of Comparative Example 5.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode catalyst for a fuel cell, comprising:
an RuSe alloy having an average particle size of less than or equal to 6 nm; and
a carrier,
wherein the RuSe alloy is present in an amount of 90 to 99 wt % based on the total weight of the cathode catalyst.

2. The cathode catalyst of claim 1, wherein the RuSe alloy is amorphous.

3. The cathode catalyst of claim 1, wherein the carrier includes a carbon carrier and has a peak intensity ratio of a carbon peak intensity with respect to a ruthenium peak intensity ($I_{carbon\ peak}/I_{ruthenium\ peak}$) ranging from 0.4 to 1.5 in an X-ray diffraction pattern measured using a CuKα ray.

4. The cathode catalyst of claim 1, wherein the cathode catalyst has an average particle size ranging from 3 to 5 nm.

5. The cathode catalyst of claim 1, wherein the cathode catalyst further comprises silica.

6. The cathode catalyst of claim 5, wherein the cathode catalyst comprises 0.001 to 1 part by weight of silica based on 100 parts by weight of the RuSe alloy.

7. The cathode catalyst of claim 1, wherein the cathode catalyst further comprises a metal carbide.

8. The cathode catalyst of claim 7, wherein the metal carbide is represented by MC where M is a metal, and the M and C have an atomic ratio ranging from 5:95 to 95:5.

9. The cathode catalyst of claim 8, wherein the metal carbide is selected from the group consisting of WC, MoC, NbC, TaC, $M_1M_2C$, and combinations thereof, wherein $M_1$ is a metal selected from the group consisting of Co, Mn, Fe, and combinations thereof, and $M_2$ is a metal selected from the group consisting of Cu, Ag, and combinations thereof.

10. The cathode catalyst of claim 7, wherein the metal carbide has a nanowire shape.

11. A membrane-electrode assembly for a fuel cell, comprising:
an anode and a cathode facing each other; and
a polymer electrolyte membrane between the anode and the cathode,
wherein the cathode comprises a cathode catalyst comprising an RuSe alloy having an average particle size of less than or equal to 6 nm and a carrier, wherein the RuSe alloy is present in the cathode catalyst in an amount of 90 to 99 wt % based on the total weight of the cathode catalyst.

12. The membrane-electrode assembly of claim 11, wherein the RuSe alloy is amorphous.

13. The membrane-electrode assembly of claim 11, wherein the carrier includes a carbon carrier and wherein the cathode catalyst has a peak intensity ratio of a carbon peak intensity with respect to a ruthenium peak intensity ($I_{carbon\ peak}/I_{ruthenium\ peak}$) ranging from 0.4 to 1.5 in an X-ray diffraction pattern measured using a CuKα ray.

14. The membrane-electrode assembly of claim 11, wherein the cathode catalyst has an average particle size ranging from 3 to 5 nm.

15. The membrane-electrode assembly of claim 11, wherein the cathode catalyst further comprises silica.

16. The membrane-electrode assembly of claim 11, wherein the cathode catalyst further comprises a metal carbide.

17. The membrane-electrode assembly of claim 16, wherein the metal carbide has a nanowire shape.

18. A fuel cell comprising:
an electricity generating element comprising:
a membrane-electrode assembly comprising:
an anode and a cathode facing each other, and
a polymer electrolyte membrane between the anode and cathode;
a fuel supplier for supplying the electricity generating element with a fuel; and
an oxidant supplier for supplying the electricity generating element with an oxidant,
wherein the cathode comprises the cathode catalyst of claim 1.

19. The fuel cell system of claim 18, wherein the Ru—Se alloy of the cathode catalyst is amorphous.

20. The fuel cell system of claim 18, wherein the carrier includes a carbon carrier and wherein the cathode catalyst has a peak intensity ratio of a carbon peak intensity with respect to a ruthenium peak intensity ($I_{carbon\ peak}/I_{ruthenium\ peak}$) ranging from 0.4 to 1.5 in an X-ray diffraction pattern measured using a CuKα ray.

21. The fuel cell system of claim 18, wherein the cathode catalyst has an average particle size ranging from 3 to 5 nm.

22. The fuel cell system of claim 18, wherein the cathode catalyst further comprises a metal carbide.

23. The fuel cell system of claim 22, wherein the metal carbide is represented by MC where M is a metal, and the M and C have an atomic ratio ranging from 5:95 to 95:5.

24. The fuel cell system of claim 22, wherein the metal carbide is selected from the group consisting of WC, MoC, NbC, TaC, $M_1M_2C$, and combinations thereof, wherein $M_1$ is a metal selected from the group consisting of Co, Mn, Fe, and combinations thereof, and $M_2$ is a metal selected from the group consisting of Cu, Ag, and combinations thereof.

25. The fuel cell system of claim 22, wherein the metal carbide has a nanowire shape.

\* \* \* \* \*